April 22, 1958     A. L. RABA     2,831,308
GRASS CUTTER
Filed Sept. 27, 1954
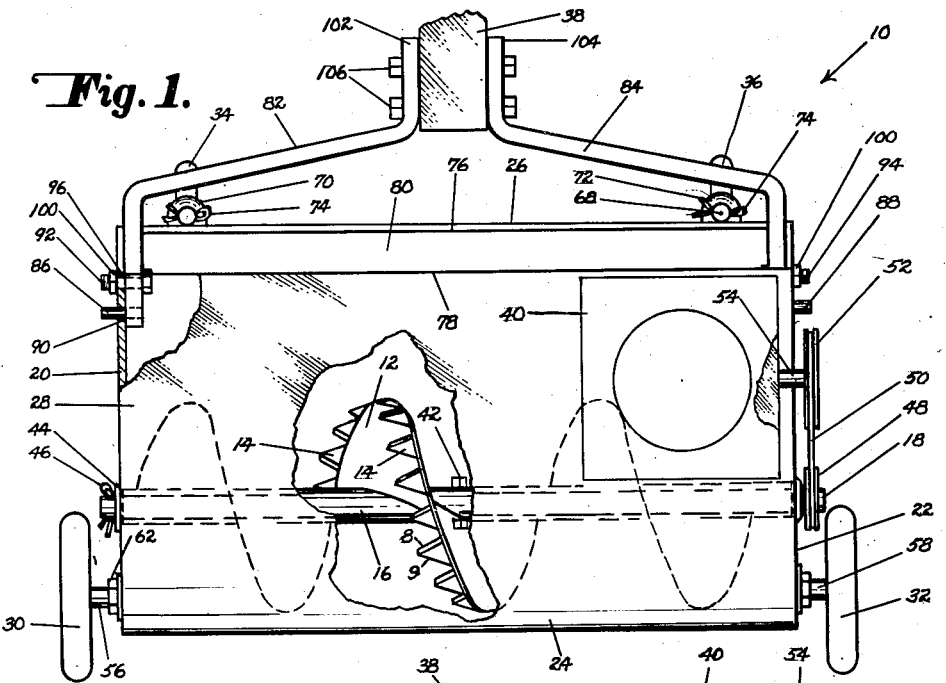
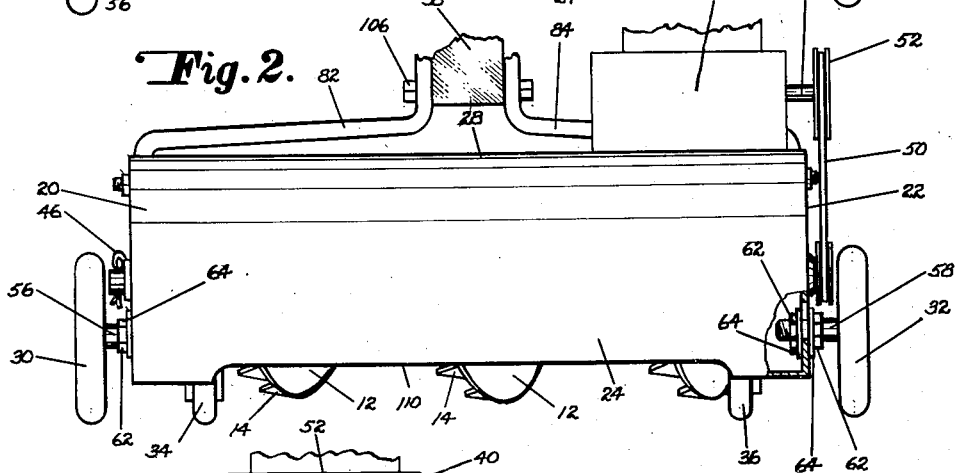
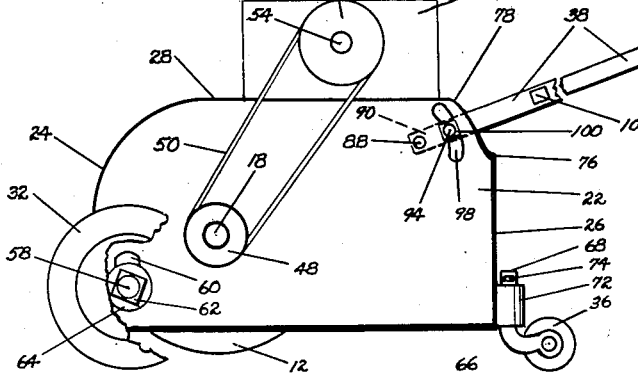
INVENTOR.
A. L. Raba
BY Arthur H. Sturges,
Attorney.

United States Patent Office 2,831,308
Patented Apr. 22, 1958

2,831,308

GRASS CUTTER

Andrew L. Raba, White Bear Lake, Minn.

Application September 27, 1954, Serial No. 458,569

1 Claim. (Cl. 56—26)

This invention relates to power actuated grass cutters, such as lawn mowers, and in particular a housing mounted on wheels and having a handle extended from one side, and a rotary cutting element in the form of an auger or spiral with cutting blades on the peripheral edge rotatably mounted in the housing with the cutting blades adapted to cut grass, weeds and the like with the cutting element rotating in either a clockwise or counterclockwise direction, and in which the cutting element is rotated by an internal combustion engine mounted on the housing.

The purpose of this invention is to provide a mower having a cutting element in the form of a screw or spiral with blades on the element positioned to cut with the element rotating in either direction, and wherein the device continues to cut grass and the like with the mower traveling forwardly or rearwardly.

With mowers having conventional spiral cutting blades it is possible to cut grass and the like with the mower moving forwardly, however, the cutting elements do not cut the grass or the like with the mower drawn rearwardly, and with conventional power actuated mowers it is difficult to make a clean cut up to a building, tree, picket fence, hedge, or the like.

With these thoughts in mind this invention contemplates an improved mower having a spiral rotating cutting element with double edge longitudinally disposed cutting blades on the peripheral edge whereby it is possible to make a clean cut up to a wall of a building, tree, fence, hedge, or the like, with the mower traveling forwardly or in reverse and with the cutting element rotating in a clockwise or counter-clockwise direction.

The object of this invention is, therefore, to provide an improved cutting element for mowers in which the mower cuts grass, weeds and the like with the cutting element rotating in either direction and with the mower traveling forwardly or in reverse.

Another object of the invention is to provide a mower having a rotatable cutting element that cuts grass and the like with the cutting element rotating in either direction in which means is provided for adjusting the elevation of the cutting element in relation to the ground.

Another important object of the invention is to provide a mower having means for cutting and moving grass simultaneously and in the same operation.

A further object of the invention is to provide a power mower having a spiral rotatable cutting element in which the transmission means for driving the cutting element by an engine on the mower is arranged whereby the cutting element is adapted to be rotated in a clockwise direction and also in a counter-clockwise direction.

A still further object of the invention is to provide a power mower for cutting grass, weeds, and the like in which the mower is adapted to make a clean cut up to substantially any object, such as a building, tree, fence, or hedge.

And a still further object is to provide a power mower having a rotatable spiral cutting element with blades adapted to cut with the element rotating in either direction in which the mower is of a simple and economical construction.

With these and other objects and advantages in view the invention embodies a housing having front, rear, and end walls, and a cover, a spiral cutting element with longitudinally disposed double edge cutting blades on the peripheral edge rotatably mounted in the end walls of the housing, an internal combustion engine mounted on the housing and operatively connected to the cutting element, caster wheels positioned at the rear of the housing, ground engaging wheels adjustably mounted on the forward part of the housing, a sectional roller for treating cut grass positioned adjacent the caster wheels, and a handle extended from the housing.

Other features and advantages of the invention will appear from the following description taken in connection with the drawings, wherein:

Figure 1 is a plan view of the improved power mower with parts of the housing broken away to show a portion of one of the convolutions of the spiral cutting element and the connection of the handle to the housing at one side of the mower, and also with a portion of the handle broken away.

Figure 2 is a front elevational view of the mower also with parts broken away.

Figure 3 is an end elevational view of the mower with parts of one of the front wheels, handle, and engine broken away.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a spiral web having cutting teeth 14 extended longitudinally from the peripheral edge and being mounted on a tube 16 on a transverse shaft 18 rotatably mounted in end walls 20 and 22 of a housing having an arcuate front wall 24, a rear wall 26 and a cover 28, numerals 30 and 32 front wheels, numerals 34 and 36 casters mounted on the rear wall 26, numeral 38 a handle, and numeral 40 an internal combustion engine or motor mounted on the cover 28 of the housing.

The cutting element, which is in the form of an auger or spiral is mounted on the tube 16, such as by welding, and the tube is secured by a bolt 42 to the shaft 18. The shaft is retained in position laterally in the housing with washers 44 and a cotter pin 46 at one end, and the opposite end is retained in position by a pulley 48. The pulley 48 is positioned to receive a belt 50 that is also trained over a pulley 52 on the shaft 54 of the engine 40.

The cutting teeth, knives, or blades 14 are triangular or V-shaped, having sharp cutting edges 8 and 9 on two sides so that the element cuts grass, weeds, and the like with the shaft rotating in both clockwise and counter-clockwise directions. The cutting teeth or knives 14 are positioned in planes parallel to the longitudinal axis of the spiral web whereby the knives are horizontally disposed.

The front wheels 30 and 32 are rotatably mounted on stub shafts 56 and 58, which extend through vertically disposed slots 60 in the end walls 20 and 22 and the stub shafts are adjustably held in the slots with nuts 62 that are threaded on the stub shafts. With a nut positioned on each side of each end wall and with a washer 64 under each nut the stub shafts with the front wheels are adapted to be moved upwardly and downwardly to adjust the elevation of the cutting element in relation to the ground.

The casters 34 and 36 include wheels which are rotatably mounted in yokes 66 from which pins 68 extend, and the pins are rotatably mounted in bearings 70 and 72 that are secured on the rear wall 26. The upper ends of the pins 68 are provided with cotter pins 74 by which the casters are retained in position.

The upper edge of the rear wall 26 is positioned at the point 76, and with the cover terminating at the point 78 a transversely disposed opening 80 is provided in the upper rear corner of the housing through which arms 82 and 84 by which the handle 38 is mounted on the housing, extend. The ends of the arms 82 and 84 are provided with pins 86 and 88 which extend through openings 90 in the end walls 20 and 22, thereby providing means for pivotally connecting the handle to the housing, and the handle is secured in adjusted positions with bolts 92 and 94 which are mounted in the arms and which extend through arcuate slots 96 and 98 in the end walls. The bolts are provided with nuts 100.

The extended ends 102 and 104 of the arms 82 and 84 are secured to the lower end of the handle with bolts 106 and the extended end of the handle is provided with a cross-bar 108.

The lower edge of the front wall 24 of the housing is provided with a recess 110 which facilitates the passage of grass, weeds, and the like into the housing and to the cutting element.

The direction of rotation of the cutting element may be reversed by crossing the belt or by other suitable means.

With the parts assembled as shown and described a power grass cutter or mower is provided that will cut grass, weeds and the like with the mower traveling forwardly or rearwardly and with the cutting element rotating in a clockwise direction or in a counter-clockwise direction, and by adjusting the front wheels the mower will cut grass short or relatively high, as may be desired. Also, with the wheels close to the housing, the mower is adapted to cut grass, weeds, and the like close to a building wall, tree, fence, hedge, or the like.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to, in actual practice, if desired.

Having now described the invention that which is claimed to be new and desired to be procured by Letters Patent, is:

In a mower, the combination which comprises a housing having an arcuate front wall, a rear wall, end walls, and a cover, a transversely disposed shaft extended through the housing and rotatably mounted in the end walls thereof, a sleeve mounted on the shaft, a spiral element having substantially triangular-shaped cutting blades with sharp cutting edges on both sides thereof mounted on the sleeve, the cutting blades being positioned in planes parallel to the axis of the transversely disposed shaft and extended longitudinally thereof wherein a cutting action of a blade is at a right angle to an object being cut, a bolt extended through the sleeve and shaft for securing the sleeve in position upon the shaft, aligned stub shafts adjustably mounted in the forward edges and lower portions of the end walls of the housing, wheels rotatably mounted on the stub shafts, casters pivotally mounted on the lower edges of the rear wall of the housing for facilitating following irregular edges of lawns, flower beds and the like, a motor positioned on the housing, said motor having a shaft, a pulley on the shaft of the motor, a pulley on the transversely disposed shaft and aligned with the pulley on the shaft of the motor, a belt trained over the pulleys for driving the cutting element, and a handle adjustably mounted on the housing.

References Cited in the file of this patent
UNITED STATES PATENTS

| | | |
|---|---|---|
| 2,165,551 | Iverson | July 11, 1939 |
| 2,509,343 | Henderson | May 30, 1950 |
| 2,537,586 | Huitema | Jan. 9, 1951 |
| 2,634,567 | Huitema | Apr. 14, 1953 |
| 2,644,501 | Perry | July 7, 1953 |
| 2,671,299 | Orr | Mar. 9, 1954 |